US012615260B1

(12) United States Patent
Patnaik et al.

(10) Patent No.: US 12,615,260 B1
(45) Date of Patent: Apr. 28, 2026

(54) SYSTEM FOR MANAGING NON-HUMAN IDENTITIES

(71) Applicant: NATOMA LABS, INC., Los Altos, CA (US)

(72) Inventors: Pratyus Patnaik, Los Altos, CA (US); William Potter, Bend, OR (US); Paresh Jawahar Bhaya, Los Gatos, CA (US); Zachary Thomas Hart, San Francisco, CA (US)

(73) Assignee: NATOMA LABS, INC., Los Altos, CA (US)

( * ) Notice: Subject to any disclaimer, the term of this patent is extended or adjusted under 35 U.S.C. 154(b) by 192 days.

(21) Appl. No.: 18/410,083

(22) Filed: Jan. 11, 2024

(51) Int. Cl.
*H04L 9/40* (2022.01)

(52) U.S. Cl.
CPC ............ *H04L 63/102* (2013.01); *H04L 63/20* (2013.01)

(58) Field of Classification Search
CPC .............................. H04L 63/102; H04L 63/20
USPC ............................................................ 726/5
See application file for complete search history.

(56) References Cited

U.S. PATENT DOCUMENTS

| | | | | |
|---|---|---|---|---|
| 7,774,408 | B2 * | 8/2010 | Sinha ................... | G06Q 10/107 |
| | | | | 709/206 |
| 12,192,370 | B2 * | 1/2025 | Cinaqui Pereira ........ | H04L 9/50 |
| 2018/0337941 | A1 * | 11/2018 | Kraning .............. | H04L 63/0227 |
| 2022/0311758 | A1 * | 9/2022 | Balasubramanian ........................ | |
| | | | | H04L 63/102 |
| 2023/0090190 | A1 * | 3/2023 | Iila ...................... | H04L 63/0876 |
| | | | | 726/1 |
| 2023/0385176 | A1 * | 11/2023 | Padmanaban P C ........................ | |
| | | | | G06F 11/3476 |

* cited by examiner

*Primary Examiner* — Anthony D Brown
(74) *Attorney, Agent, or Firm* — Lindauer Law, PLLC

(57) ABSTRACT

Non-human identities (NHI) are present in many organizations. NHIs may be associated with automated processes, bots, devices, and so forth. NHIs may be involved in operations within an organization, as well as operations that interact with other organizations. The creation and management of NHIs differs from human identities. A system for managing NHIs ingests data from an existing system and determines the NHIs. Once determined, the system provides a single management point for NHIs, providing visibility and allowing management according to specified best practices appropriate to the organization. New NHIs may be provisioned as needed and with appropriate security permissions. Access credentials of NHIs may be rotated. Old, unused, or compromised NHIs may be quickly deprovisioned. Operations that are better performed by an NHI may be migrated from a human identity to the NHI, avoiding breakage due to changes in the human identity status.

20 Claims, 12 Drawing Sheets

Figure 3:
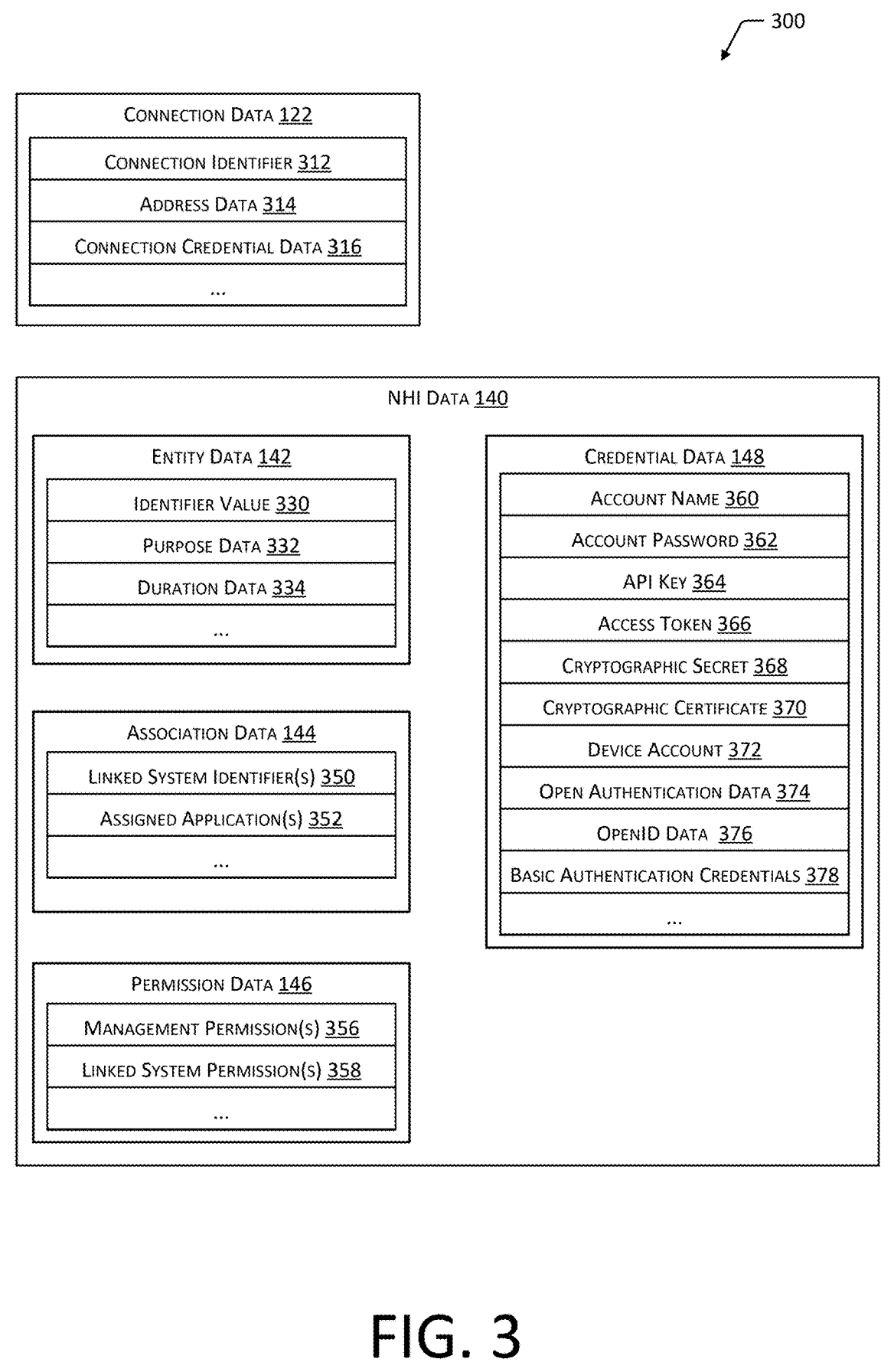

300

CONNECTION DATA 122

CONNECTION IDENTIFIER 312

ADDRESS DATA 314

CONNECTION CREDENTIAL DATA 316

...

NHI DATA 140

ENTITY DATA 142

IDENTIFIER VALUE 330

PURPOSE DATA 332

DURATION DATA 334

...

ASSOCIATION DATA 144

LINKED SYSTEM IDENTIFIER(S) 350

ASSIGNED APPLICATION(S) 352

...

PERMISSION DATA 146

MANAGEMENT PERMISSION(S) 356

LINKED SYSTEM PERMISSION(S) 358

...

CREDENTIAL DATA 148

ACCOUNT NAME 360

ACCOUNT PASSWORD 362

API KEY 364

ACCESS TOKEN 366

CRYPTOGRAPHIC SECRET 368

CRYPTOGRAPHIC CERTIFICATE 370

DEVICE ACCOUNT 372

OPEN AUTHENTICATION DATA 374

OPENID DATA 376

BASIC AUTHENTICATION CREDENTIALS 378

CLASSIFICATION RULE(S) 132

| |
|---|
| USER TYPE COMPARISON 432 |
| ACCOUNT PROFILE COMPARISON 434 |
| EMAIL PATTERN COMPARISON 436 |
| USERNAME PATTERN COMPARISON 438 |
| LOG PATTERN COMPARISON 440 |
| ... |

500

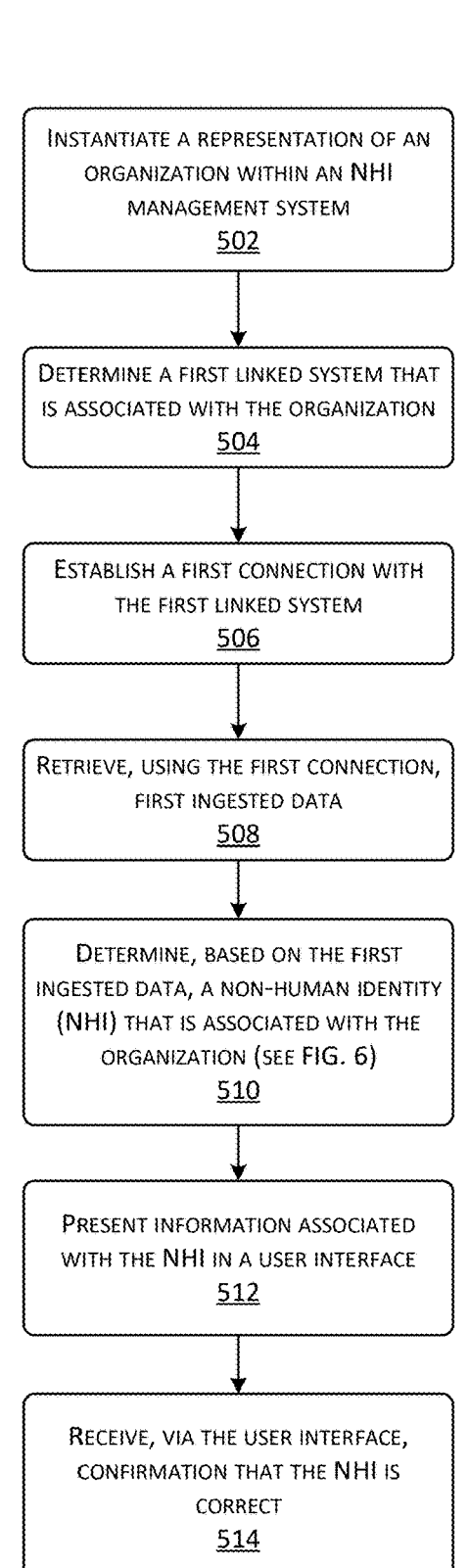

INSTANTIATE A REPRESENTATION OF AN ORGANIZATION WITHIN AN NHI MANAGEMENT SYSTEM
502

DETERMINE A FIRST LINKED SYSTEM THAT IS ASSOCIATED WITH THE ORGANIZATION
504

ESTABLISH A FIRST CONNECTION WITH THE FIRST LINKED SYSTEM
506

RETRIEVE, USING THE FIRST CONNECTION, FIRST INGESTED DATA
508

DETERMINE, BASED ON THE FIRST INGESTED DATA, A NON-HUMAN IDENTITY (NHI) THAT IS ASSOCIATED WITH THE ORGANIZATION (SEE FIG. 6)
510

PRESENT INFORMATION ASSOCIATED WITH THE NHI IN A USER INTERFACE
512

RECEIVE, VIA THE USER INTERFACE, CONFIRMATION THAT THE NHI IS CORRECT
514

FIG. 5

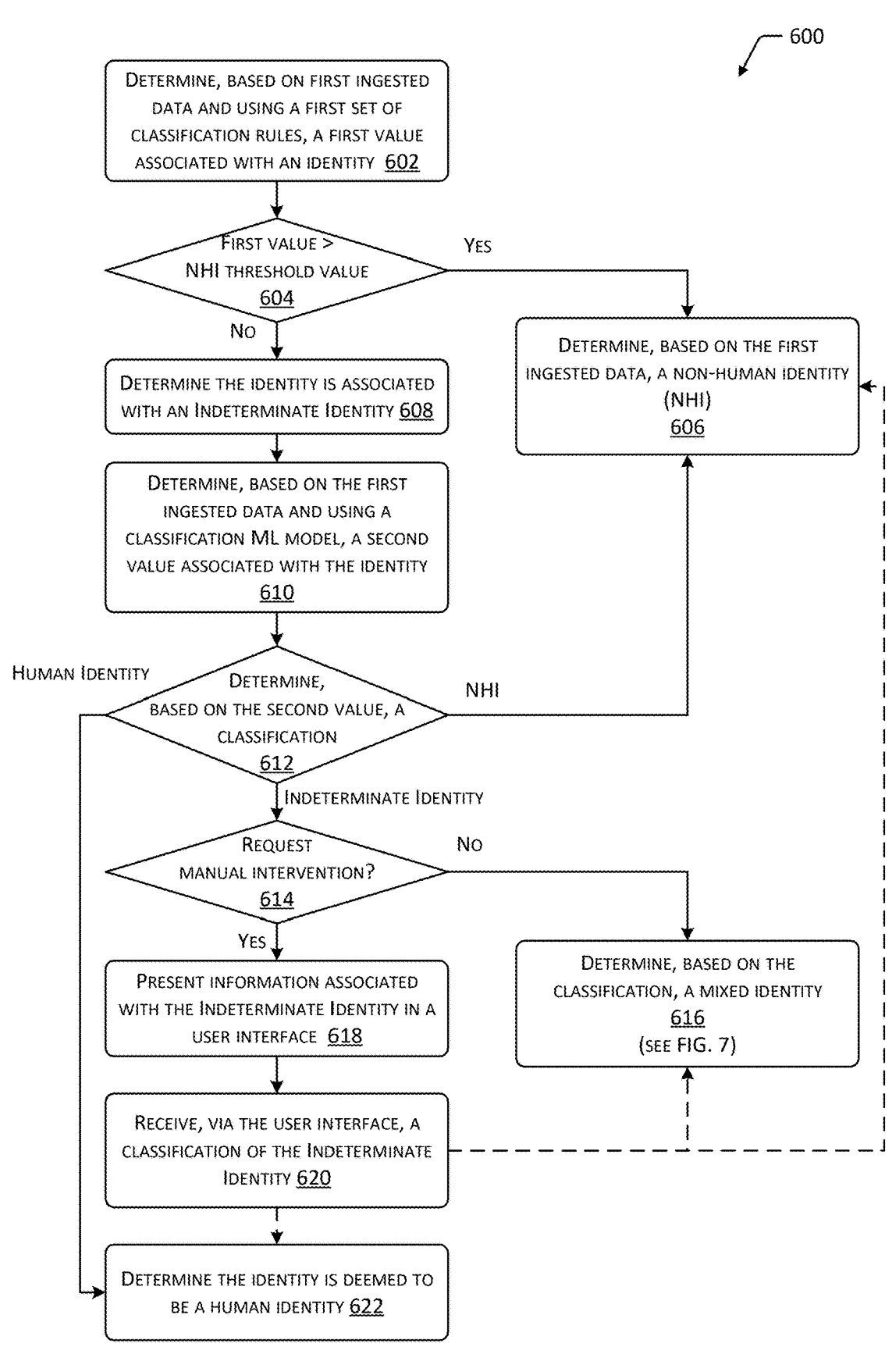

600

DETERMINE, BASED ON FIRST INGESTED DATA AND USING A FIRST SET OF CLASSIFICATION RULES, A FIRST VALUE ASSOCIATED WITH AN IDENTITY 602

FIRST VALUE > NHI THRESHOLD VALUE 604

YES

NO

DETERMINE, BASED ON THE FIRST INGESTED DATA, A NON-HUMAN IDENTITY (NHI) 606

DETERMINE THE IDENTITY IS ASSOCIATED WITH AN INDETERMINATE IDENTITY 608

DETERMINE, BASED ON THE FIRST INGESTED DATA AND USING A CLASSIFICATION ML MODEL, A SECOND VALUE ASSOCIATED WITH THE IDENTITY 610

HUMAN IDENTITY

DETERMINE, BASED ON THE SECOND VALUE, A CLASSIFICATION 612

NHI

INDETERMINATE IDENTITY

REQUEST MANUAL INTERVENTION? 614

NO

YES

PRESENT INFORMATION ASSOCIATED WITH THE INDETERMINATE IDENTITY IN A USER INTERFACE 618

DETERMINE, BASED ON THE CLASSIFICATION, A MIXED IDENTITY 616 (SEE FIG. 7)

RECEIVE, VIA THE USER INTERFACE, A CLASSIFICATION OF THE INDETERMINATE IDENTITY 620

DETERMINE THE IDENTITY IS DEEMED TO BE A HUMAN IDENTITY 622

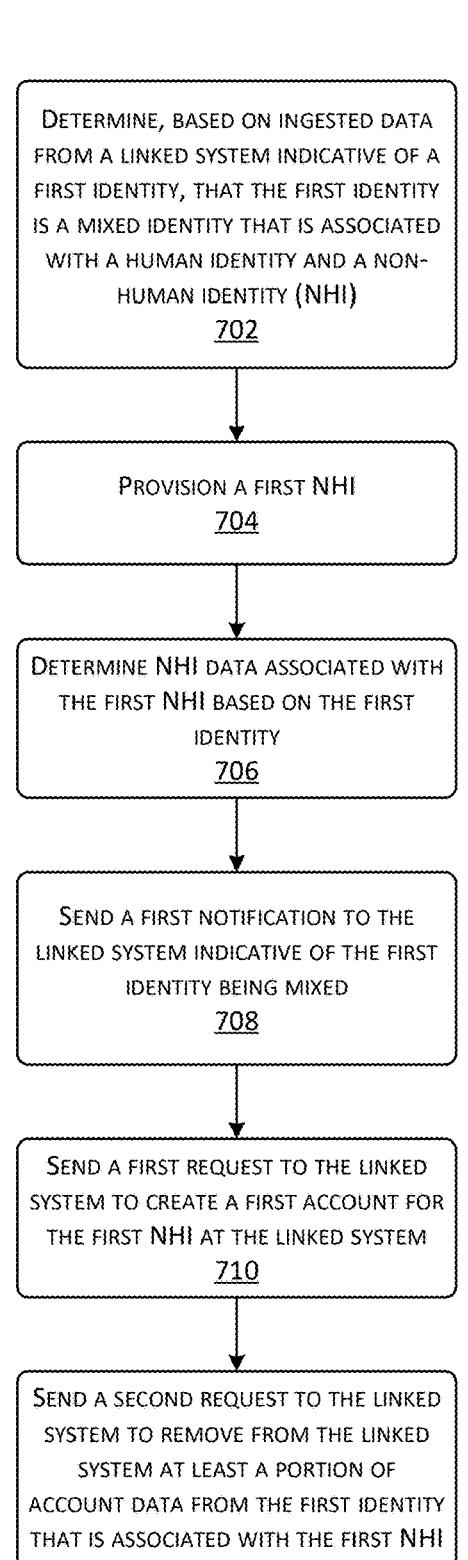

DETERMINE, BASED ON INGESTED DATA FROM A LINKED SYSTEM INDICATIVE OF A FIRST IDENTITY, THAT THE FIRST IDENTITY IS A MIXED IDENTITY THAT IS ASSOCIATED WITH A HUMAN IDENTITY AND A NON-HUMAN IDENTITY (NHI)
702

PROVISION A FIRST NHI
704

DETERMINE NHI DATA ASSOCIATED WITH THE FIRST NHI BASED ON THE FIRST IDENTITY
706

SEND A FIRST NOTIFICATION TO THE LINKED SYSTEM INDICATIVE OF THE FIRST IDENTITY BEING MIXED
708

SEND A FIRST REQUEST TO THE LINKED SYSTEM TO CREATE A FIRST ACCOUNT FOR THE FIRST NHI AT THE LINKED SYSTEM
710

SEND A SECOND REQUEST TO THE LINKED SYSTEM TO REMOVE FROM THE LINKED SYSTEM AT LEAST A PORTION OF ACCOUNT DATA FROM THE FIRST IDENTITY THAT IS ASSOCIATED WITH THE FIRST NHI
712

FIG. 7

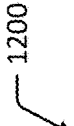
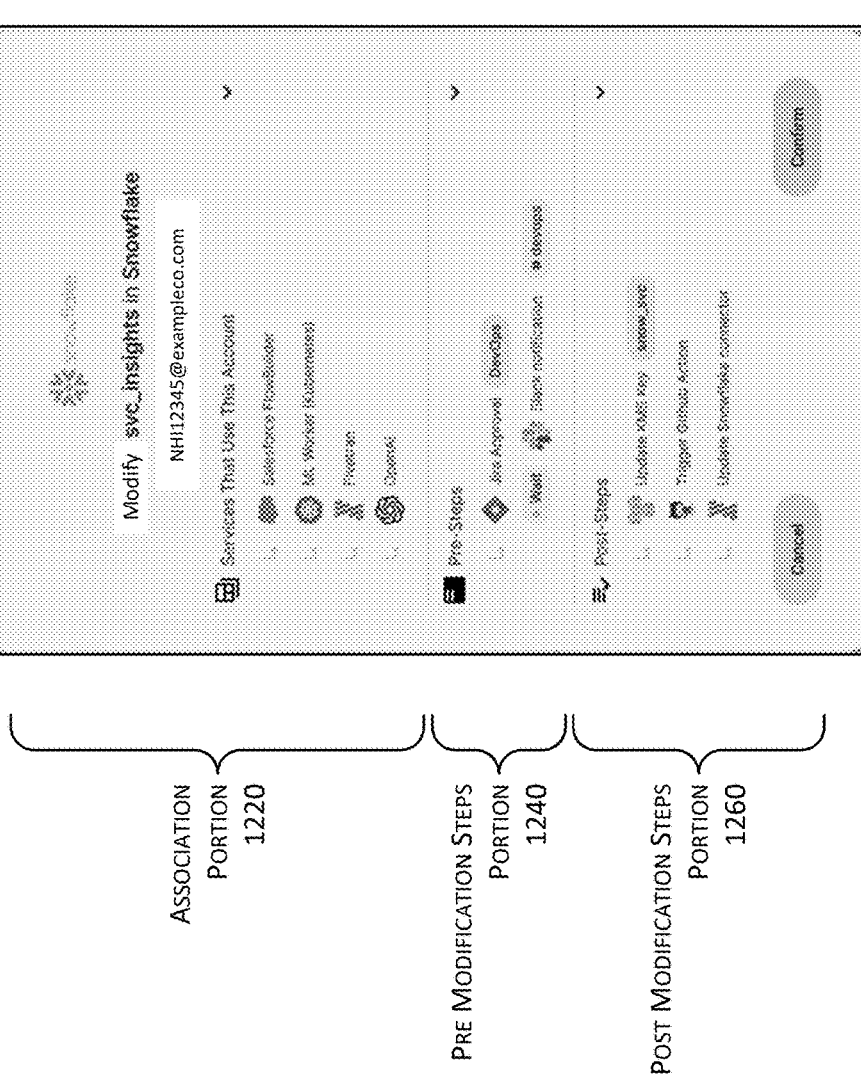
FIG. 12
ASSOCIATION PORTION 1220
PRE MODIFICATION STEPS PORTION 1240
POST MODIFICATION STEPS PORTION 1260

SYSTEM FOR MANAGING NON-HUMAN IDENTITIES

BACKGROUND

Technologies such as Software as a Service (Saas), cloud compute, network enabled devices, and so forth involve myriad interactions between participating systems.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 3 illustrates connection data and NHI data, according to one implementation.

FIG. 5 illustrates a flow diagram of a process to ingest data into an NHI system, according to some implementations.

FIG. 6 illustrates a flow diagram of a process to determine indeterminate and mixed identities in an NHI system, according to some implementations.

FIG. 7 illustrates a flow diagram of a process to separate a mixed identity to determine an NHI, according to some implementations.

FIG. 12 illustrates a third user interface providing information about the NHIs of an organization, according to some implementations.

Figure 1:
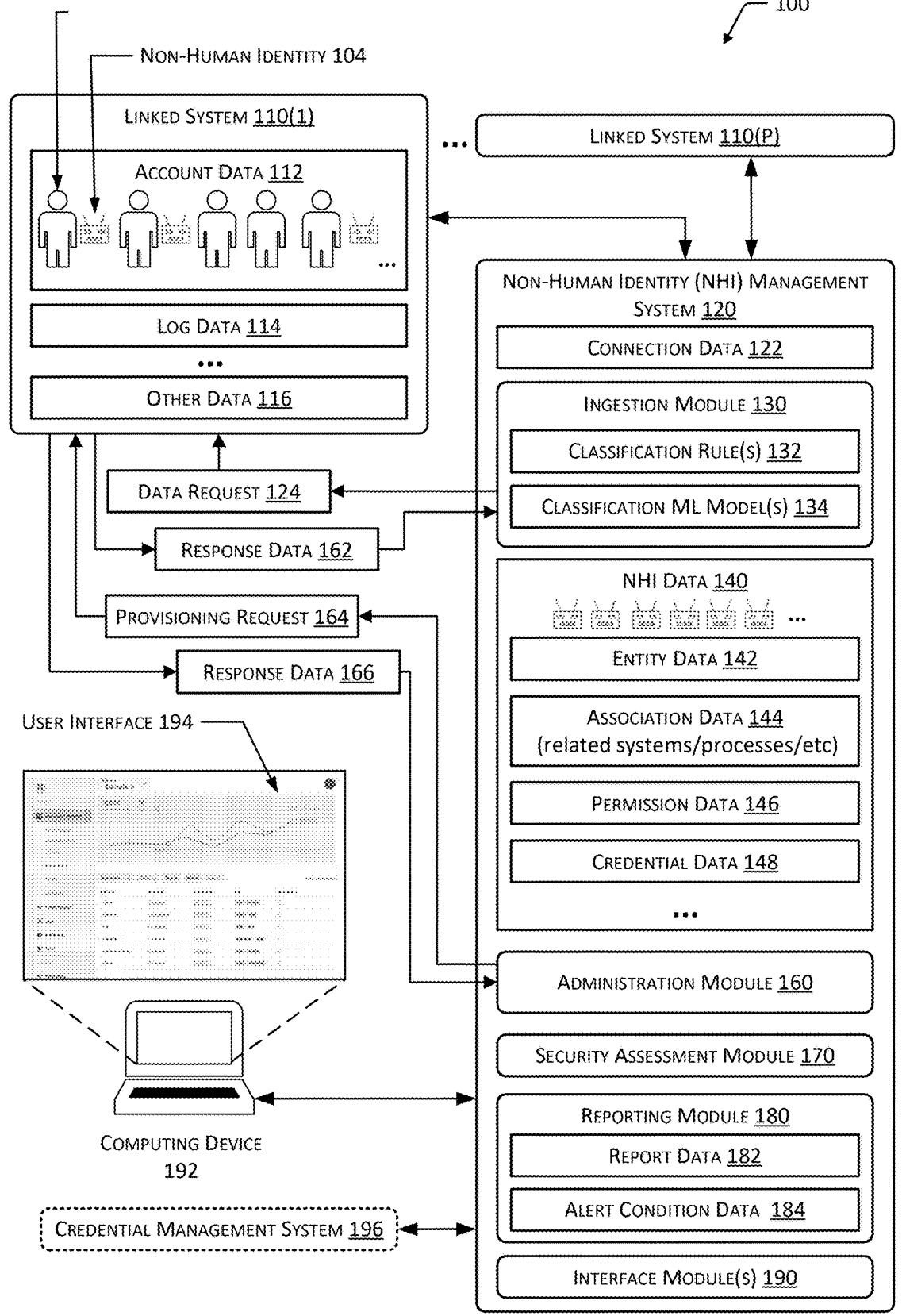
FIG. 1 illustrates a system for managing non-human identities (NHIs), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Traditionally organizations have considered humans as the only entities interacting with their respective computer systems and hardware. For example, a new account may be created in a computer system of an organization for a newly hired person. The account is designated for use with, and is indicative of, that human identity. The person may use that account to perform the functions associated with their job. Eventually, the person may leave the organization, and their account may be closed. Because humans have been the primary entities interacting with these systems, these traditional systems are human-centric.

Traditional approaches have attempted to use human-centric systems to facilitate operations by non-human participants. For example, a human user may use their account to perform an automated process. However, use of a human user's account to perform automated processes introduces substantial operational and information security issues. For example, if the human user's account is disabled, such as due to the human leaving the organization, those automated processes may be broken. In another example, compromise of the human user's account would also result in compromise of an automated process, or vice versa. A system administrator may attempt to reduce the chance for breakage by creating another account that is then used by the automated process. However, this may introduce other problems. For example, the account may have permissions that are unneeded to perform the process, may fail in the event of a security update that requires multi-factor authentication that the automated process is unable to perform, and so forth.

The expansion of technologies such as Software as a Service (Saas), cloud computing, network enabled devices, and so forth have resulted in a substantial increase in the number of non-human participants that enable these technologies. Existing human-centric methodologies and systems lack the scalability, flexibility, and ability to manage these non-human participants.

Described in this disclosure is a system and techniques for creating and managing non-human identities (NHIs) associated with an organization. An NHI management system coordinates the provisioning, modification, deprovisioning, and other operations associated with NHIs. This may include requesting actions by one or more linked systems. For example, the NHI management system may request creation of an account or other object on a linked system that is associated with the NHI and used to perform the specified purpose of the NHI with respect to operations on the linked system. In another example, the NHI management system may initiate a change of access credentials associated with an NHI across one or more linked systems.

NHIs may be associated with various purposes such as operation of automated processes, software bots, operation of devices, and so forth. An NHI specifies a particular non-human participant. Each NHI may comprise a unique combination of a specified purpose and access credentials to one or more linked systems that are necessary to perform some part of the specified purpose. This combination is unique across the NHIs associated with the organization.

The NHI may be managed by human users or other automated systems. A human identity may be associated with an NHI for management or oversight purposes, but the NHI exists independently of the human identity. For example, the human identity assigned to manage a particular NHI may be changed without affecting operation of the NHI to perform its specified purpose.

The NHI management system may be configured with connections to linked systems used by the organization. A linked system may comprise a computational resource that may be outside of the organization. For example, a linked system may comprise an SaaS service, code repository service, data storage service, web server service, and so forth. These connections may provide for a secured exchange of information such as account data, log data, requests, and so forth.

The NHI management system may ingest data from a linked system via a connection. For example, the NHI management system may ingest account data from a directory service used by the organization. The ingested data may be processed to determine which accounts or other objects are classified as being associated with NHIs. The determination of the NHI may be based on data obtained from one or more linked systems.

The classification of the ingested data may be performed deterministically. For example, classification rules comprising regular expressions may be used to process the account data and look for specified patterns of username and email address that have been deemed to be indicative of an NHI.

The classification of the ingested data may be performed non-deterministically, such as with previously trained machine learning (ML) systems. For example, a classification ML model may be used to determine a classification as to whether an account in the ingested account data is associated with an NHI or is a mixed identity. A mixed identity occurs when a human identity has been shared or otherwise used by a non-human participant. For example, the mixed identity may occur when a human user provides their human user account credentials to an automated process. In comparison, an indeterminate identity may be determined that indicates further information or input is required to determine the appropriate classification.

Based on the ingested data, NHI's may be created within the NHI management system. NHI data for each NHI may be stored that includes information such as the identifier of the NHI, specified purpose of the NHI, which linked systems it is associated with, permissions associated with operation, credential data used to interact with linked systems, and so forth. A mixed identity may be processed to create an NHI that may then be subsequently used, removing the reliance on the human identity.

The NHI management system provides a single management point for NHIs. This provides a substantial improvement in operational efficiency and information security for the organization. NHIs may be managed according to specified best practices appropriate to the organization. New NHIs may be provisioned as needed and with appropriate access credentials for necessary linked systems, and appropriate permissions within those linked systems. Maintenance operations such as rotating access credentials of NHIs may be easily performed. Old, unused, or compromised NHIs may be quickly deprovisioned.

Illustrative System

FIG. 1 illustrates a system 100 for managing non-human identities (NHIs), according to some implementations. One or more linked systems 110(1), 110(2), . . . , 110(P) are shown. Each linked system 110 may comprise one or more computing devices executing instructions stored in memory. Participants interacting with a linked system 110 may be associated with human identities 102 or non-human identities (NHIs) 104. For example, human identities 102 are associated with human users. NHIs 104 are associated with non-human users, such as automated processes, software bots, operation of devices, and so forth. NHIs 104 are discussed in more detail in the following.

The linked system 110 may comprise one or more of account data 112, log data 114, or other data 116. The account data 112 may comprise information about accounts or other data objects that are associated with particular human identities 102 or NHIs 104. For example, the account data 112 may comprise account information such as a username, access credentials, permissions, and so forth. To utilize the linked system 110, the account data 112 associated with an identity may be used. For example, a human identity 102 may use associated human identity account data 112 to access the linked system 110. Continuing the example, an NHI 104 may use associated NHI account data 112 to access the linked system 110.

During operation of the linked system 110 log data 114 may be created. For example, the log data 114 may comprise audit logs, process logs, access logs, diagnostic logs, security logs, and so forth. For example, log data may indicate when an account was used to access the linked system 110, what process or function was used by the account, and so forth.

A non-human identity management system 120 is depicted. The NHI management system 120 may use connection data 122 to access one or more of the linked systems 110. For example, the connection data 122 may comprise a network address, connection credential data, and so forth used to establish a connect between the NHI management system 120 and the linked system 110. The connection data 122 is discussed in more detail with regard to FIG. 3.

The NHI management system 120 may comprise an ingestion module 130. The ingestion module 130 accepts as input ingested data from one or more linked systems 110 and determines if any NHIs 104 are indicated by that ingested data. As NHIs 104 are determined, NHI data 140 is created that comprises information associated with a particular NHI 104. The ingestion module 130 may use a connection, such as specified by the connection data 122, to send a data request 124 to the linked system 110. Responsive to the data request 124, response data 162 may be returned to the NHI management system 120. The response data 162 may comprise at least a portion of one or more of the account data 112, log data 114, or other data 116. For example, the data request 124 during initial setup of an organization to use the NHI management system 120 may comprise a request for all account data 112 and audit log data 114. The response data 162 from one or more linked systems 110 may be used as ingested data that is provided as input to the ingestion module 130.

The ingestion module 130 attempts to determine if an identity is a human identity 102 or an NHI 104. In some implementations an identity that is not able to be classified as a human identity 102 or an NHI 104 may be deemed to be an "indeterminate identity". Indeterminate identities may be further processed by other automated or manual methods. For example, as described with regard to FIGS. 5 and 6, information about an indeterminate identity may be presented in a user interface 194 to allow a human operator to determine the classification of identity.

A "mixed identity" occurs when a human identity has been shared or otherwise used by a non-human participant. For example, the mixed identity may occur when a human user provides their human user account credentials to an automated process. As discussed in more detail below, such as with regard to FIG. 7, mixed identities may be processed to establish an NHI 104 in the NHI management system 120 and separate the human identity 102 from the NHI 104.

The classification of the identities within the ingested data may be performed deterministically. In one implementation classification rules 132 may comprise pattern matching expressions such as regular expressions ("regexes") that are used to perform comparisons or other processing on the ingested data. For example, the account data 112 may be compared using the regexes to determine specified patterns of username and email address that have been deemed to be indicative of an NHI 104. The classification rules 132 are discussed in more detail with regard to FIG. 4.

The classification of the identities within the ingested data may be performed non-deterministically, such as with previously trained machine learning (ML) systems. For example, a classification ML model 134 may be used to determine a classification as to whether an account in the ingested account data 112 is associated with an NHI 104, an indeterminate identity, or is a mixed identity.

The ingestion module 130 may use one or more of the deterministic or non-deterministic means to determine the classification of an identity indicated by the ingested data. In some implementations the ingestion module 130 may determine one or more values or scores that are indicative of a likelihood of whether an identity is an NHI 104. A first threshold value may be used to assess deterministic output, such as the results from processing the ingested data with the classification rules 132. A second threshold value may be used to assess nondeterministic output, such as a confidence value produced as output by a classification ML model 134. This is discussed in more detail with regard to FIG. 6.

The ingestion module 130 may be used during initial setup of the organization in the NHI management system 120 and during ongoing operation. For example, the ingestion module 130 may send data requests 124 to the linked systems 110 on demand, at scheduled intervals, or upon determination of a triggering event. In some implementations, the ingestion module 130 may moderate one more of the scope or frequency of sending data requests 124 to comply with rate limits associated with respective linked systems 110. For example, the ingestion module 130 may be configured to request relatively small batches of account data 112, such as five hundred records at a time, to avoid saturation or violation of policies of the linked system 110. In another example, the data request 124 may include one or more filter parameters which may be processed by the linked system 110 to return a subset of available data.

The ingestion module 130 may prioritize sending of data requests 124 to particular linked systems 110 or applications, or services executing thereon. For example, the ingestion module 130 may prioritize data requests 124 to linked systems 110 that are deemed to have a relatively high concentration of NHIs 104.

The ingestion module 130 may be used to determine linked systems 110 with minimal or no human intervention. In one implementation, the ingestion module 130 may process the account data 112, log data 114, or other data 116 obtained from a first linked system 110(1) and determine that the first linked system 110(1) is interacting with a second linked system 110(2). For example, the log data 114 may indicate that an account in the account data 112 of the first linked system 110(1) is being used to call the second linked system 110(2).

Connection data 122 associated with the second linked system 110(2) may be obtained, and the ingestion module 130 may send a data request 124 to the second linked system 110(2).

The ingestion module 130 may use stored data, such as previously received account data 112, log data 114, or other data 116, during operation. For example, the ingestion module 130 may compare previously stored account data 112 with newly received account data 112 to determine changes have occurred that indicate an NHI 104. In another example, the ingestion module 130 may analyze stored log data 114 for a specified number of days to determine an NHI 104.

The ingestion module 130 may be used to assess previously generated NHI data 140. For example, the ingestion module 130 may use data from the linked systems 110 to determine if an NHI 104 is still in use, if the permissions associated with the NHI 104 have changed, if the NHI 104 is improperly being used by a human identity 102, and so forth.

The NHI management system 120 may create an NHI 104 based on output from the ingestion module 130 or responsive to other operations, such as an input to the administration module 160. Upon determination of an NHI 104, NHI data 140 is created. In some implementations, each NHI 104 may be deemed to be a unique combination of specified purpose and access credentials that are necessary to perform some part of that specified purpose. The uniqueness of the combination may be within the context of the organization.

The NHI data 140 may comprise one or more of entity data 142, association data 144, permission data 146, credential data 148, or other data. The entity data 142 may comprise information about the NHI 104 such as an identifier and purpose data indicative of the purpose of the NHI 104. The association data 144 may comprise information indicative of the linked systems 110, processes, and so forth that are associated with use of the NHI 104. The permission data 146 may indicate system, process, file, or other permissions associated with use of the NHI 104. The credential data 148 may comprise information used to provide access to a linked system 110 or other systems associated with use of the NHI 104. The NHI data 140 is discussed in more detail with regard to FIG. 3.

In situations in which the NHI 104 represented by the NHI data 140 is based on the ingested data, one or more attributes specified by the NHI data 140 may be based on the ingested data. For example, if the account data 112 from the linked system 110(1) indicates the account, classified as being an NHI 104, has an account name of "retrievebot" and password of "unicorn", this information may be included in the NHI data 140. In situations in which the NHI 104 is provisioned initially at the NHI management system 120, NHI data 140 may be based on user input, a predetermined template, data from a linked system 110, and so forth.

Once an NHI 104 is represented in the NHI data 140 of the NHI management system 120, use of that NHI 104 may be effectively managed. An administration module 160 may coordinate operations such as provisioning an NHI 104, deprovisioning an NHI 104, rotating the access credentials associated with a particular NHI 104, and so forth. These operations may be invoked by an automated process or by a human operator. For example, a human operator may use a user interface 194 presented on a computing device 192 that is in communication with an interface module 190 to send a request to operate the ingestion module 130 to retrieve and process ingested data, provision a new NHI 104, deprovision and existing NHI 104, modify an existing NHI 104, rotate access credentials of an NHI 104, and so forth. The computing device 192 may comprise a desktop computer, workstation, laptop computer, tablet computer, smartphone, and so forth. The process of provisioning is discussed in more detail with regard to FIG. 8. The process of rotating credentials or making other modifications is discussed in more detail with regard to FIG. 9.

The NHI management system 120 may include an administration module 160. The administration module 160 may interact with the linked systems 110 to perform various operations associated with the NHIs 104. The administration module 160 may use the connections specified by the connection data 122 to send a provisioning request 164 to one or more linked systems 110 that are associated with an NHI 104. The one or more linked systems 110 may then return response data 166. For example, the interface module 190 may receive a request to create a new NHI 104 for an automated process. Based on the request, the administration module 160 determines which linked systems 110 will be associated with this new NHI 104. The administration module 160 may also determine other attributes such as permissions that will be needed by the NHI 104 to satisfy its specified purpose. The administration module 160 may then send provisioning requests 164 to the linked systems 110 that will be associated with the new NHI 104 to create corresponding account data 112 in the respective linked systems 110, or recognize the credentials associated with the new NHI 104. The linked systems 110 may send their respective response data 166 that reports status of the processing of the provisioning request 164 and any supporting data associated with the account of the new NHI 104. The NHI data 140 may be updated as appropriate. For example, access credentials associated with the account may be received from the linked system 110 and stored as credential data 148 associated with the NHI 104.

During operation, the NHI management system 120 may continue to ingest data from the linked systems 110. This ingested data may be processed to determine if information associated with an existing NHI 104 has been modified, to determine if a new NHI 104 has been created, to assess operation of an NHI 104, and so forth.

A security assessment module 170 may be used to assess one or more attributes of the NHI data 140 and other information associated with an NHI 104 to enforce one or more policies, determine an actual or potential information security failure, and so forth. The security assessment module 170 may be used to implement a policy in which credential data 148 expires and is replaced, resulting in a rotation of access credentials. For example, for NHI 104 (3039) the credential data 148 may comprise a username and password combination associated with linked system 110 (47), and the last date the password was changed was 13 days ago. Given a specified policy to rotate the access credentials every 14 days, upon or before expiration of the time period, the security assessment module 170 may send a request to the administration module 160 to change the password for NHI 104 (3039) at linked system 110(47). The administration module 160 may then satisfy the request, and store the newly changed password in the credential data 148 associated with NHI 104 (3039).

The security assessment module 170 may assess available data to determine the occurrence of potentially suspicious activity. For example, the security assessment module 170 may assess the log data 114 from one or more linked systems 110 to determine a change in application programing interface (API) calls made by NHI 104 (773) in the past six hours.

The NHI management system 120 may include a reporting module 180. The reporting module 180 may generate report data 182 based on one or more of the response data 162, response data 166, NHI data 140, and so forth. For example, the reporting module 180 may generate report data 182 indicative of the names and details of the NHIs 104 associated with an organization as maintained by the NHI management system 120. The reporting module 180 may receive data from other modules and provide output based on this data. For example, the security assessment module 170 may send to the reporting module 180 information indicative of a policy violation associated with a particular NHI 104. The reporting module 180 may determine, based on this information, alert condition data 184. The alert condition data 184 is indicative of one or more attributes or behaviors of an NHI 104 that are inconsistent with specified threshold values or policies.

The NHI management system 120 may include one or more interface modules 190. The interface module 190 may provide interfaces for human operators or other systems. For example, a computing device 192 may communicate with the interface module 190 to receive data from the NHI management system 120 that is then used to present a user interface 194 on the computing device 192. In another example, the interface module 190 may provide an API.

In some implementations, the NHI management system 120 may utilize an external credential management system 196. For example, the credential management system 196 may comprise a security repository that is used to store at least a portion of the credential data 148.

Figure 2:
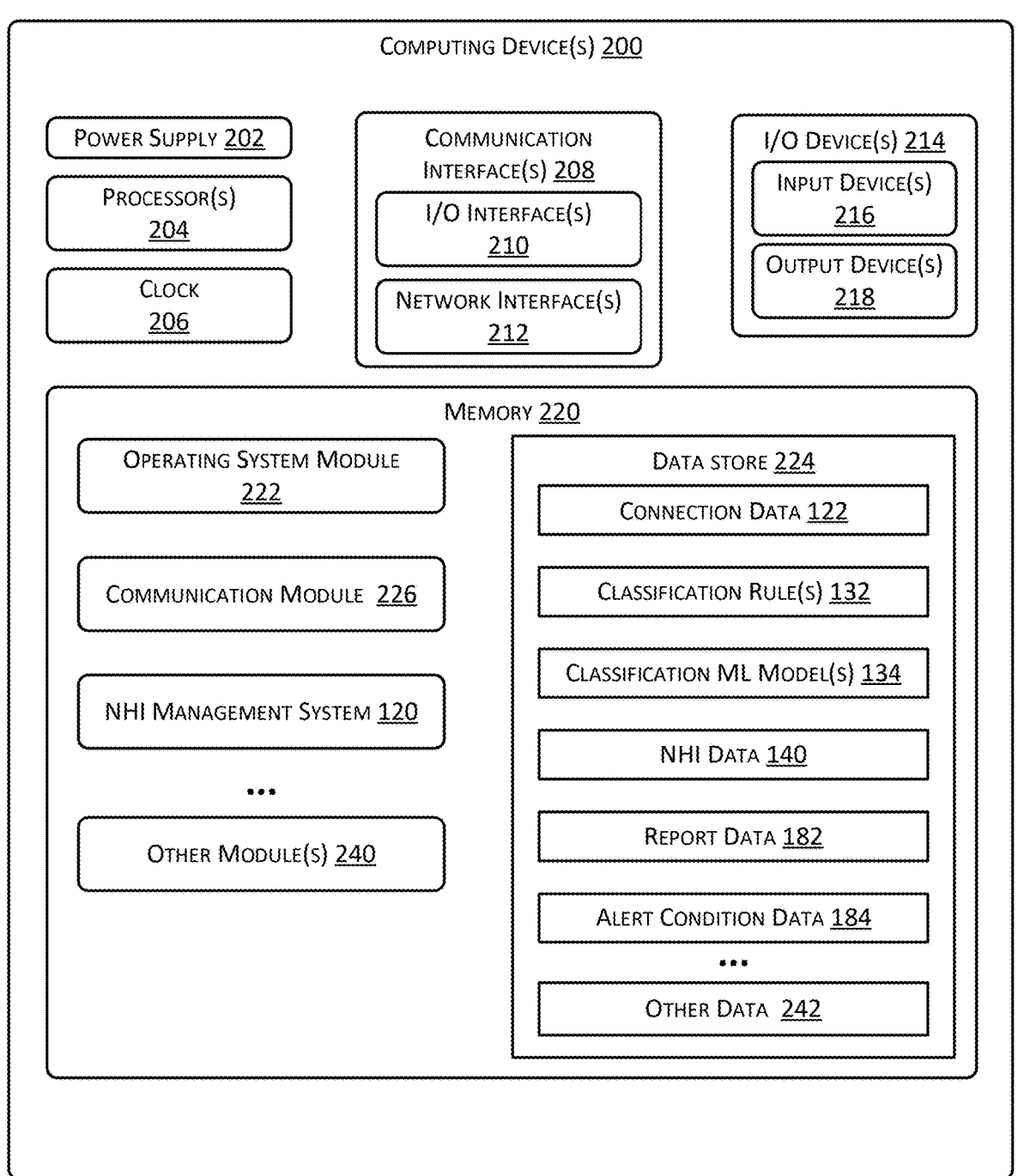
FIG. 2 is a block diagram of a computing device to implement the system, according to some implementations.

FIG. 2 is a block diagram of a computing device 200 to implement the system 100, according to some implementations. The computing device 200 may be implemented as one or more of an "embedded system", "on-demand computing", "software as a service (Saas)", "platform computing", "network-accessible platform", "cloud services", "data centers", and so forth. Services provided by the computing device 200 may be distributed across one or more physical or virtual devices.

One or more power supplies 202 may be configured to provide electrical power suitable for operating the components in the computing device 200. The one or more power supplies 202 may comprise batteries, connections to an electric utility, and so forth. The computing device 200 may include one or more hardware processors 204 (processors) configured to execute one or more stored instructions. For example, the hardware processors 204 may include application specific integrated circuits (ASICs), field-programmable gate arrays (FPGAs), digital signal processors (DSPs), hardware accelerators, graphics processing units (GPUs), and so forth. The processors 204 may comprise one or more cores. One or more clocks 206 may provide information indicative of date, time, ticks, and so forth.

The computing device 200 may include one or more communication interfaces 208 such as input/output (I/O) interfaces 210, network interfaces 212, and so forth. The communication interfaces 208 enable the computing device 200, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, Peripheral Component Interconnect (PCI), serial AT attachment (SATA), and so forth.

The I/O interface(s) 210 may couple to one or more I/O devices 214. The I/O devices 214 may include input devices 216 such as one or more of a sensor, keyboard, mouse, scanner, and so forth. The I/O devices 214 may also include output devices 218 such as one or more of a display device, printer, audio speakers, and so forth. In some embodiments, the I/O devices 214 may be physically incorporated with the computing device 200 or may be externally placed.

The network interfaces 212 may be configured to provide communications between the computing device 200 and other devices, such as routers, access points, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi, Bluetooth, and so forth.

The computing device 200 may also include one or more buses or other internal communications hardware or software that allow for the transfer of data between the various modules and components of the computing device 200.

As shown in FIG. 2, the computing device 200 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the computing device 200. A few example functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the I/O interfaces 210, the I/O devices 214, the communication interfaces 208, and provide various services to applications or modules executing on the processors 204. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 220 may be a data store 224 and one or more of the following modules. For example, these modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including other computing devices 200, network attached storage devices, and so forth.

The data store 224 may store one or more of connection data 122, classification rules 132, classification ML models 134, NHI data 140, report data 182, alert condition data 184, and so forth.

The memory 220 may also store a communication module 226 configured to establish communications with other computing devices 200 or other devices. The communications may be authenticated, encrypted, and so forth.

The memory 220 may also store the NHI management system 120.

Other modules 240 may also be present in the memory 220 as well as other data 242 in the data store 224.

FIG. 3 illustrates at 300 connection data 122 and NHI data 140, according to one implementation.

The connection data 122 comprises information that is associated with establishing a connection between the NHI management system 120 and the linked system 110. The connection data 122 may comprise one or more of a connection identifier 312, address data 314, connection credential data 316, and so forth. The connection identifier 312 may comprise data that is indicative of a particular connection associated with an organization. The address data 314 may comprise a network address, uniform resource locator, uniform resource identifier, and so forth. The connection credential data 316 comprises one or more credentials that may be used to establish communication between the NHI management system 120 and the linked system 110. For example, the connection credential data 316 may comprise cryptographic data, token data, and so forth.

NHI data 140 comprises information about each NHI 104 within the NHI management system 120. The NHI data 140 may comprise one or more of the entity data 142, the association data 144, the permission data 146, the credential data 148, or other data.

The entity data 142 may comprise one or more of an identifier value 330, purpose data 332, duration data 334, and so forth. The identifier value 330 is indicative of a particular NHI 104 within an organization. In some implementations, the identifier value 330 may be unique within the context of a particular organization. The purpose data 332 is indicative of a specified purpose that is associated with the NHI 104. The purpose data 332 may comprise a string, free form description, structured data, or other data. For example, the purpose data 332 may specify "perform the daily automated sales reporting". In some implementations the purpose data 332 may specify a functional purpose or an operational purpose. For example, a functional purpose may be associated with a particular set of actions that are to be performed. In another example, an operational purpose may be associated with a specified outcome such as production of particular output. The duration data 334 may be indicative of how long the NHI 104 is expected to be used for. For example, the duration data 334 may specify "indefinite" that indicates no endpoint, or may specify an expiration date for the NHI 104.

The association data 144 may comprise one or more of a linked system identifier 350, assigned application 352, or other data. The linked system identifier 350 is indicative of one or more linked systems 110 that the NHI 104 interacts with. The assigned application 352 is indicative of one or more software applications that are associated with operation of the NHI 104.

The permission data 146 may comprise one or more of management permission(s) 356, linked system permission(s) 358, or other permissions associated with use of the NHI 104. The management permission(s) 356 are indicative of permissions associated with management of the NHI 104 with respect to the NHI management system 120. For example, the management permission(s) 356 may specify which users of the NHI management system 120 are allowed to make changes, and the scope of those changes, to the NHI 104. The linked system permission(s) 358 are indicative of permissions associated with respective linked systems 110. The linked system permission(s) 358 may include, or be based on, permission data specified by account data 112 at one or more linked systems 110 that are associated with the NHI 104. For example, the linked system permission(s) 358 may indicate that the NHI 104 has read access of data from the first linked system 110(1), write access of data to the second linked system 110(2), and so forth.

The credential data 148 may comprise information used to provide access to a linked system 110 or other systems associated with use of the NHI 104. The credential data 148 may comprise an account name 360, account password 362, API key 364, access token 366, cryptographic secret 368, cryptographic certificate 370, device account 372, open authentication "OAuth" data 374, OpenID data 376, basic authentication credentials 378, and so forth. For example, the open authentication "OAuth" data 374 may comprise data that is compliant with at least a portion of the "OAuth 2.0 Authorization Framework" as promulgated by the Internet Engineering Task Force. In another example, the OpenID data 376 is associated with the OpenID standard promulgated by the OpenID Foundation.

In some implementations, each NHI 104 may be deemed to be a unique combination of purpose data 332 and credential data 148. The uniqueness of the combination may be within the context of the organization.

In some implementations, at least a portion of the credential data 148 may be maintained using an external credential management system 196.

Each NHI 104 may be deemed to be a unique combination of attributes specified by the NHI data 140. In one implementation, an NHI 104 may be a unique combination of specified purpose and access credentials that are necessary to perform some part of that specified purpose. In other implementations, an NHI 104 may be a unique combination of one or more of the entity data 142, association data 144, permission data 146, or credential data 148. For example, the NHI 104 may be a unique combination of association data 144. In another example, the NHI 104 may be unique combination of association data 144 and credential data 148. In yet another example, the NHI 104 may be a unique combination of association data 144 and permission data 146. In some implementations, the uniqueness of the combination may be within the context of the organization.

In other implementations, each NHI 104 may be deemed to be a unique combination of linked systems 110 and access credentials.

Figure 4:
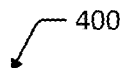
FIG. 4 illustrates classification rules, according to one implementation.

FIG. 4 illustrates at 400 classification rules 132, according to one implementation. The classification rules 132 may be used by the ingestion module 130 to determine if ingested data, such as account data 112, log data 114, or other data 116 from a linked system 110 includes an NHI 104. For example, the classification rules 132 may be used to perform a comparison or other assessment of the ingested data.

The classification rules 132 may comprise rules that represent a user type comparison 432, account profile comparison 434, email pattern comparison 436, username pattern comparison 438, log pattern comparison 440, and so forth. The user type comparison 432 may search for specified values in the ingested data, such as a "user type" entry in account data 112 that is used to specify a type of user such as "employee", "contractor", "system", and so forth. The account profile comparison 434 may search for specified values in the ingested data, such as workgroup, permission groups, and so forth. The account profile comparison 434 may also search for non-null entries in various attributes such as "first name", "last name", "telephone number", "department", and so forth. The email pattern comparison 436 may determine if a particular pattern is present in an email address as compared to username of the account, and so forth. The username pattern comparison 438 may determine if some portion of another field such as "first name" or "last name" appears within the email address. The log pattern comparison 440 may determine if the log data is indicative of a particular pattern of actions consistent with an NHI 104 rather than a human identity 102. For example, log data 114 that indicates operations performed during nighttime hours, on a consistently repeating schedule may be indicative of an NHI 104.

The rules may be expressed as programming code, pattern matching expressions such as regular expressions ("regex"), script processing language, and so forth. In some implementations sets of rules may be specified. For example, a set of regular expressions may be defined that are used to determine if an account in account data 112 is likely to be an NHI 104.

/service-([A-Za-z0-9]+)@company.com/i REGEX 1
/^((svc|sa|service|machine|robot|conn|connector)
    [-_\.].*|.*[-_\.](svc|sa|service|machine|robot|conn-
    |connector))(\+.*)?@/i
REGEX 2

FIG. 5 illustrates a flow diagram 500 of a process to ingest data into an NHI management system 120, according to some implementations. The process may be implemented at least in part by one or more computing devices 200.

At 502 a representation of an organization is instantiated within the NHI management system 120. For example, records associated with the "ExampleCo" organization may be created within a data store 224.

At 504 a linked system 110 that is associated with the organization is determined. For example, a human operator associated with the organization may use the user interface 194 to provide information about one or more linked systems 110 that are used by the organization.

At 506 a first connection with the first linked system 110 is established. For example, connection data 122 may be determined that allows communication with the first linked system 110.

At 508 first ingested data is retrieved using the first connection. For example, the NHI management system 120 may send a data request 124 to the first linked system 110 using the first connection. Continuing the example, the response data 162 may be returned via the first connection responsive to the data request 124. The response data 162 may comprise account data 112, log data 114, or other data 116.

At 510 an NHI 104 is determined based on the first ingested data, that is associated with the organization. For example, the ingestion module 130 may process the first ingested data using the classification rules 132, classification ML models 134, and so forth. This determination is discussed in more detail with regard to FIG. 6.

In some implementations operations at 512 and 514 may be performed.

At 512 information associated with the NHI 104 is presented in a user interface 194. For example, information about an identity that has been determined by the ingestion module 130 to be an NHI 104 or an indeterminate identity may be presented in the user interface 194.

At 514 the user interface is used to receive data indicative of a classification of the identity. For example, the user interface 194 may be used to receive user input that confirms the identity is an NHI 104 that should be added to the NHI management system 120.

FIG. 6 illustrates a flow diagram 600 of a process to determine indeterminate and mixed identities in an NHI system, according to some implementations. The process may be implemented at least in part by one or more computing devices 200.

At 602 a first value associated with an identity is determined based on first ingested data and using a first set of classification rules 132. For example, the first ingested data comprising information about an identity may be processed using one or more regular expressions. Each classification rule 132 may be associated with a weight value. The first value may comprise a score that is calculated based on a sum of the weight values associated with the classification rules 132 that are found to match or otherwise correspond with the first ingested data.

At 604 a determination may be made as to whether the first value is greater than a first NHI threshold value. If yes, the process may proceed to 606. If no, the process may proceed to 608.

At 606 a determination of an NHI 104 is made based on the first ingested data. For example, the identity is deemed to be an NHI 104.

At 608 the identity indicated in first ingested data may be deemed to be an indeterminate identity. The process then proceeds to 610.

At 610 a second value associated with the identity may be determined based on the first ingested data and using one or more classification ML models 134. For example, the first ingested data or a portion thereof may be processed by a classification ML model 134 to determine classification data and a confidence value indicative of a likelihood that the classification data is accurate. The second value may comprise the confidence value. In some implementations output from a plurality of classification ML models 134 may be combined to determine the second value. For example, the second value may comprise an average of a plurality of confidence values.

At 612 a classification of the identity is determined based on the second value. This classification may involve comparison of the second value to a set of specified ranges or thresholds. For example, if the second value is greater than a second NHI threshold value, the process may proceed to 606 and the identity may be deemed to be an NHI 104. If the second value is less than or equal to a third NHI threshold value, the process may proceed to 622 and the identity may be deemed to be a human identity 102. If the second value is greater than the third NHI threshold value and less than or equal to the second NHI threshold value, the identity may be deemed to be an indeterminate identity and the process may proceed to 614.

At 614 a determination is made whether to request manual intervention. For example, the determination may be based on a parameter that has been set for the organization. If no, the process may proceed to 616. If yes, the process may proceed to 618.

At 616 the identity is determined to be a mixed identity. Processing of the mixed identity is discussed in more detail with regard to FIG. 7.

At 618 information associated with the indeterminate identity is presented in a user interface. For example, information about the indeterminate identity may be presented in the user interface 194.

At 620 the user interface is used to receive data indicative of a classification of the identity. For example, the user interface 194 may be used to receive user input that specifies the identity is to be classified as a human identity 102, a mixed identity, or an NHI 104. If the identity is deemed to be a human identity 102, the process proceeds to 622. If the identity is deemed to be a mixed identity, the process proceeds to 616. If the identity is deemed to be an NHI 104, the process proceeds to 606.

At 622 the identity is determined to be a human identity 102. In some implementations, information indicative of this classification may be maintained to facilitate later ingestion of data from the linked system(s) 110. For example, later changes in one or more linked systems 110 to the human identity 102 may be monitored to determine if the human identity 102 has become a mixed identity or has been repurposed to an NHI 104.

FIG. 7 illustrates a flow diagram 700 of a process to separate a mixed identity to determine an NHI 104, according to some implementations. The process may be implemented at least in part by one or more computing devices 200.

At 702, based on ingested data from a linked system 110 indicative of a first identity, determine that the first identity is a mixed identity. For example, a first identity may be determined to be a mixed identity as described above with regard to FIG. 6.

At 704 a first NHI 104 is provisioned. For example, entity data 142 within the NHI data 140 may be created that is representative of the first NHI 104.

At 706 NHI data 140 associated with the first NHI 104 is determined. In some implementations, a portion of the NHI data 140 may be determined based on the first identity. For example, one or more of the association data 144, permission data 146, or credential data 148 may be copied from the first identity.

At 708 a first notification may be sent to the linked system 110. For example, the notification may advise the linked system 110 that the mixed identity was detected. In some implementations the linked system 110 may perform one or more actions responsive to the notification.

At 710 a first request may be sent to the linked system 110 to create an account for the first NHI 104 at the linked system 110. For example, the administration module 160 may send a provisioning request 164 to the linked system 110. The first request may be based at least in part on the NHI data 140.

At 712 a second request may be sent to the linked system 110 to remove from the linked system 110 at least a portion of account data 112 from the first identity that is associated with the first NHI 104. For example, a provisioning request 164 may be sent that requests removal of permission to access one or more services, applications, and so forth that have been deemed to be associated with the first NHI 104.

In other implementations the request may request other actions, such as initiating an automated process at the linked system 110, opening a trouble ticket for an administrator of the linked system 110, disabling the first identity at the linked system 110, and so forth.

Figure 8:
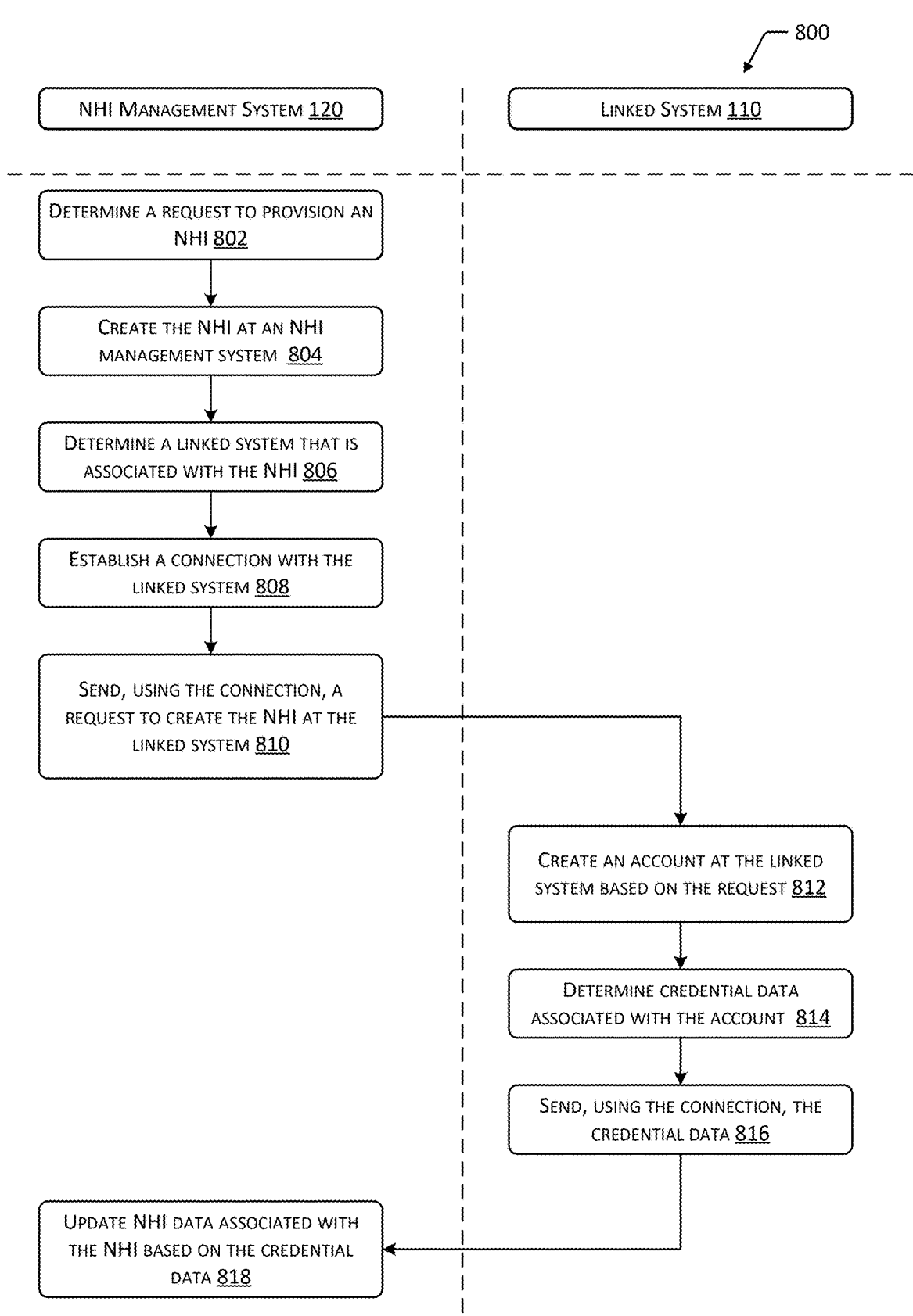
FIG. 8 illustrates a flow diagram of a process to provision an NHI, according to some implementations.

FIG. 8 illustrates a flow diagram 800 of a process to provision an NHI 104, according to some implementations. The process may be implemented at least in part by one or more computing devices 200. In this diagram operations associated with the NHI management system 120 are shown on the left side of the figure and operations associated with a linked system 110 are shown on the right side. Operations 802-810 and 818 are performed by the NHI management system 120, operations 812-816 are performed by the linked system 110.

This process may be used by a human operator or automated system to create an NHI 104 in the NHI management system 120. In comparison, the ingestion process as described with respect to the ingestion module 130 attempts to determine the NHI 104 based on other data.

At 802 the NHI management system 120 determines a request to provision an NHI 104. For example, an automated process or human operator may send a request that is received by the interface module 190.

At 804 the NHI 104 comprising NHI data 140 is created within the NHI management system 120. For example, the NHI data 140 comprising one or more of the entity data 142, association data 144, permission data 146, credential data 148, and so forth may be determined based on input associated with the request, retrieval of previously stored data, and so forth. Once determined, the NHI data 140 may be stored in the memory 220.

At 806 a linked system 110 that is associated with the NHI data 140 is determined. For example, the association data 144 or the credential data 148 may be indicative of a linked system 110.

At 808 a connection with the linked system 110 is established. For example, the connection data 122 associated with the linked system 110 may be used to establish the connection.

At 810 a request is sent to the linked system 110, using the connection, to create an account for the NHI 104 at the linked system 110. For example, the administration module 160 may send a provisioning request 164 to the linked system 110.

At 812 an account is created at the linked system 110 based on the request. For example, responsive to the provisioning request 164, the linked system 110 may add an account to the account data 112. In some implementations the linked system 110 may use other schema or constructs for operation. For example, instead of accounts the linked system 110 may utilize objects.

At 814 credential data 148 associated with the account on the linked system 110 is determined. For example, the credential data 148 may be generated by the linked system 110, obtained from another linked system 110, or may be generated by the NHI management system 120.

At 816 the credential data 148 is sent, using the connection, to the NHI management system 120.

At 818 the NHI data 140 associated with the NHI 104 is updated based on the credential data 148. For example, the credential data 148 associated with the linked system 110 may be stored in the memory 220 as NHI data 140 associated with the NHI 104.

Figure 9:
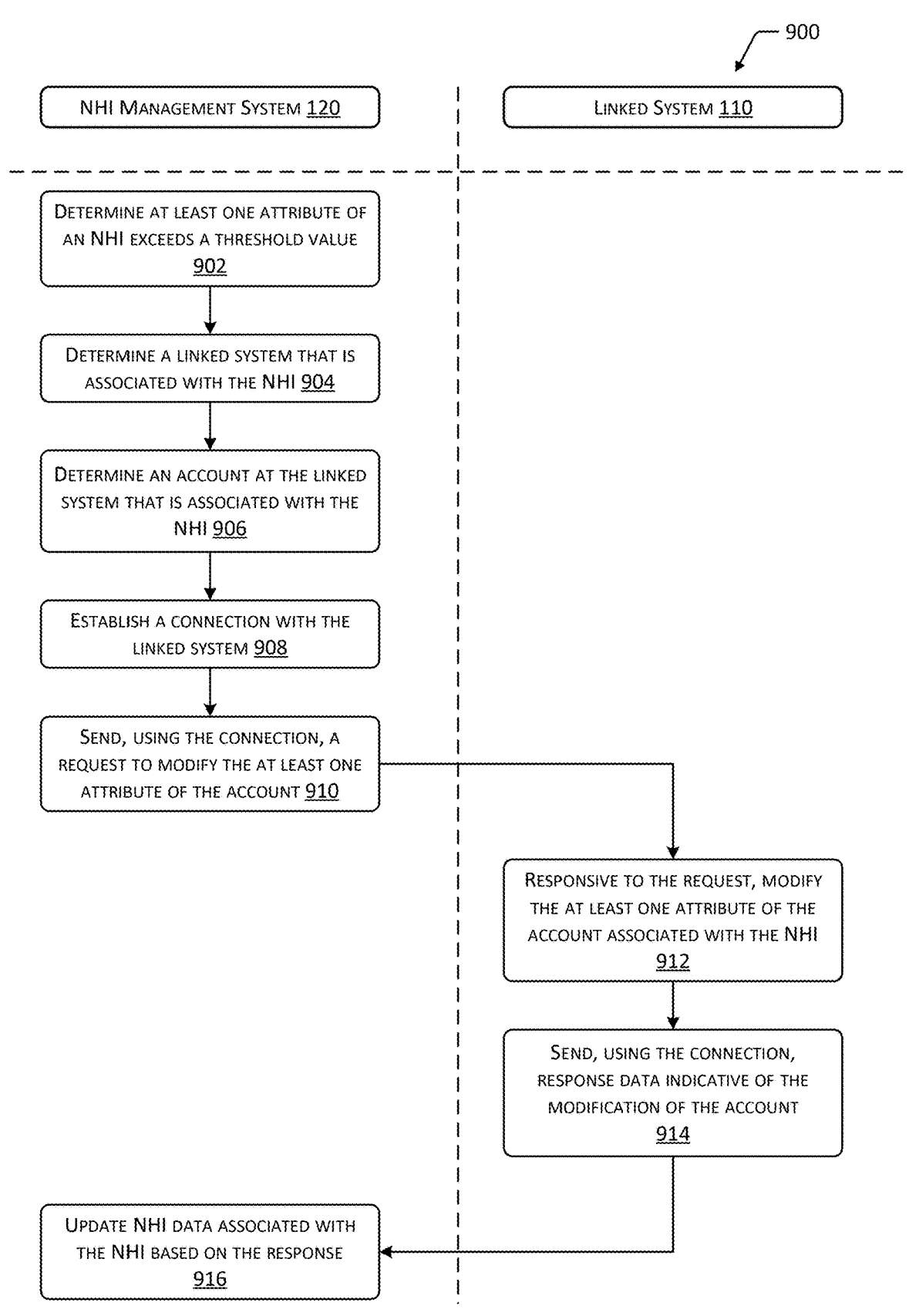
FIG. 9 illustrates a flow diagram of a process to modify attributes of accounts at linked systems that are associated with an NHI, according to some implementations.

FIG. 9 illustrates a flow diagram 900 of a process to modify attributes of accounts at linked systems 110 that are associated with an NHI 104, according to some implementations. The process may be implemented at least in part by one or more computing devices 200. This process may be used for various purposes, including rotating credential data 148 to maintain information security.

In this diagram operations associated with the NHI management system 120 are shown on the left side of the figure and operations associated with a linked system 110 are shown on the right side. Operations 902-910 and 916 are performed by the NHI management system 120, operations 912 and 914 are performed by the linked system 110. This process may be initiated by a human operator or automated system.

At 902 at least one attribute of an NHI 104 as stored in the NHI data 140 is determined to exceed a threshold value. For example, hours since last change of credential data 148 may have reached a threshold maximum value. In some implementations, one or more of the attributes and associated threshold values may be specified or used by the security assessment module 170. In another example, the attribute may be a risk score that has been determined by operation of the security assessment module 170.

In some implementations 902 may be omitted, and a request to modify one or more attributes of the NHI 104 may be determined. For example, a request to disable an NHI 104 may be received.

At 904 a linked system 110 that is associated with the NHI data 140 is determined. For example, the association data 144 or the credential data 148 may be indicative of a linked system 110.

At 906 an account at the linked system 110 that is associated with the NHI data 140 is determined. For example, the association data 144 or the credential data 148 may be indicative of the account at the linked system 110.

At 908 a connection with the linked system 110 is established. For example, the connection data 122 associated with the linked system 110 may be used to establish the connection.

At 910 a request is sent to the linked system 110, using the connection, to modify the at least one attribute of the account for the NHI 104 at the linked system 110. For example, the administration module 160 may send a provisioning request 164 to the linked system 110 to issue new credential data 148. In another example, the administration module 160 may send a deprovisioning request 164 to the linked system 110 to discontinue the account at on the linked system 110. For example, the account may be discontinued by revoking all permissions, setting to a disabled status, preventing further use of the account, deleting the account, and so forth.

At 912, responsive to the request, the at least one attribute of the account that is associated with the NHI 104 is modified at the linked system 110. For example, the linked system 110 may issue new credential data 148 that is associated with the account. In another example, the linked system 110 may discontinue the account.

At 914 response data 166 is sent to the NHI management system 120, using the connection, that is indicative of the modification of the account. For example, the response data 166 may include newly issued credential data 148.

At 916 the NHI data 140 associated with the NHI 104 is updated at the NHI management system 120 based on the response. For example, the credential data 148 stored in the NHI data 140 is updated to include the newly issued credential data 148. In another example, if the NHI 104 is being deprovisioned, the NHI data 140 associated with the NHI 104 may be removed from the memory 220 of the system, flagged as inactive, and so forth.

Figure 10:
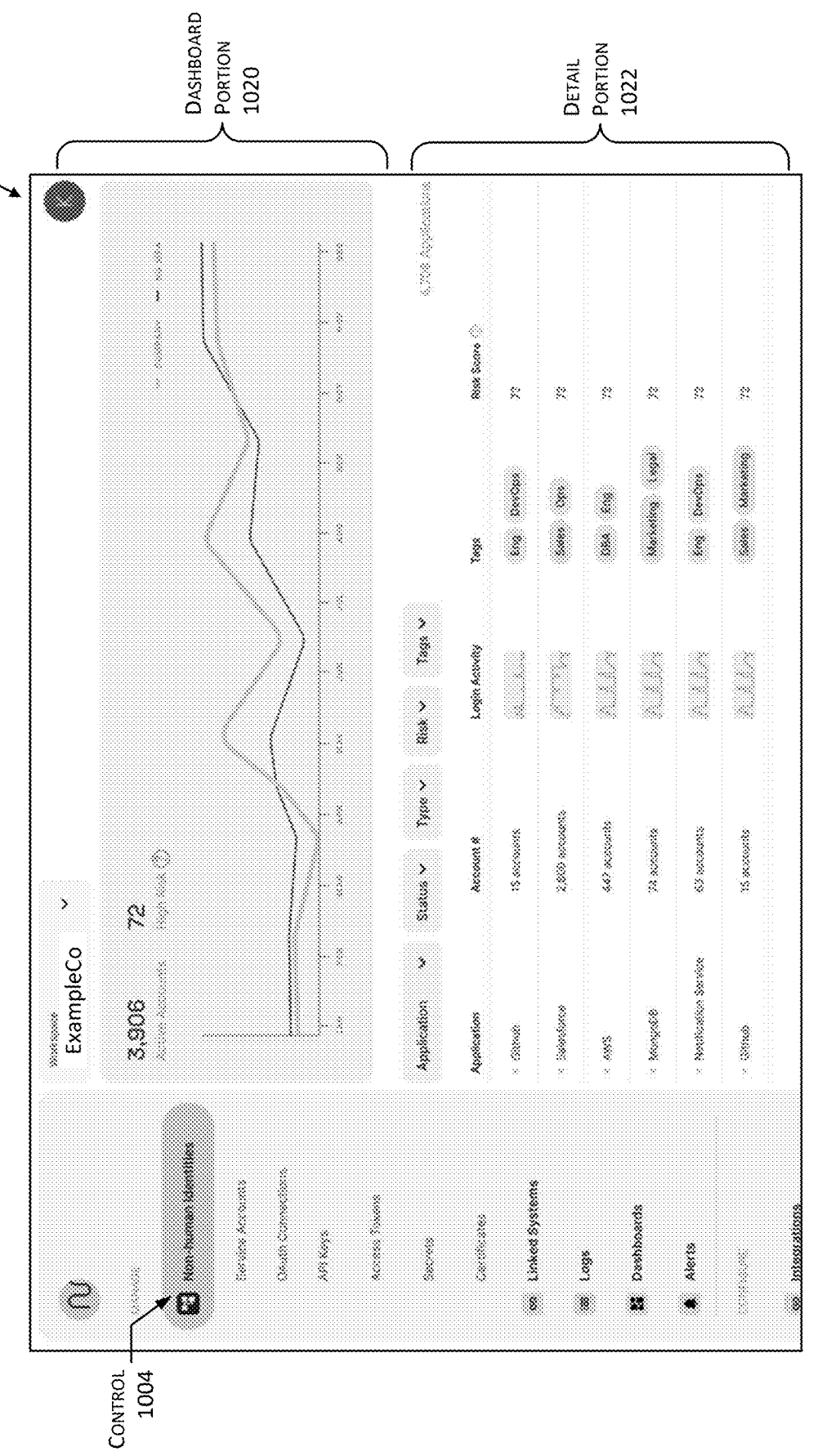
FIG. 10 illustrates a first user interface providing information about the NHIs of an organization, according to some implementations.

FIG. 10 illustrates at 1000 a first user interface 194 providing information about the NHIs 104 of an organization, according to some implementations. The first user interface 194 may be presented using the computing device 192. In this and the following figures, a graphical user interface (GUI) is presented by way of illustration, and not necessarily as a limitation. In other implementations other user interfaces such as character user interfaces, voice user interfaces, and so forth may be used.

A left-hand pane of the first user interface includes a control 1004 that may be used to select a particular display option, such as overall display of "non-human identities" (as shown) or information about particular attributes of NHIs 104, such as "service accounts", "OAuth connections", "API Keys", "Access Tokens", "Secrets", "Certificates", and so forth.

Also shown in the left-hand pane are other display options for "linked systems", "logs", "dashboards", and "alerts". For example, selection of the "linked systems" display option presents information about the linked systems 110 associated with the organization.

A dashboard portion 1020 depicts the information associated with the selected display option. In this illustration, the dashboard portion 1020 presents a line graph showing the number of active NHIs 104 that are maintained by the NHI management system 120 by month, and a count of the number of NHI's 104 that have been deemed by the security assessment module 170 as being "high risk".

A detail portion 1022 provides additional information about various aspects of the organization. In this illustration, various software applications and their associated status, number of accounts associated with each application, login activity, associated organizational tags, and risk scores are depicted. For example, the security assessment module 170 may determine a risk score for a particular NHI 104, application, linked system 110, and so forth based on the values of one or more attributes of the NHI data 140, assessment of other data such as log data 114, and so forth.

Figure 11:
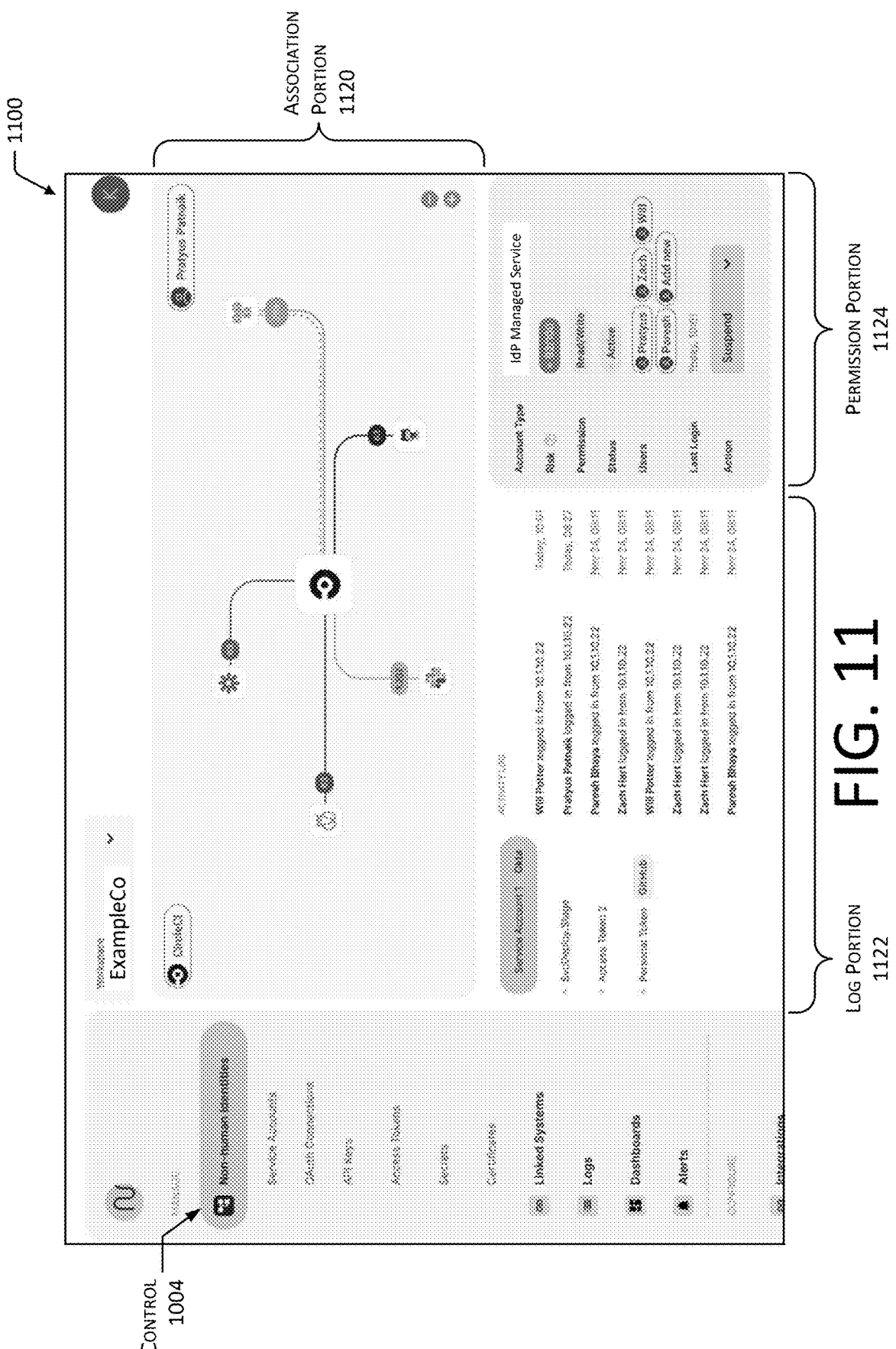
FIG. 11 illustrates a second user interface providing information about the NHIs of an organization, according to some implementations.

FIG. 11 illustrates at 1100 a second user interface 194 providing information about the NHIs 104 of an organization, according to some implementations. The second user interface 194 may be presented using the computing device 192.

The second user interface 194 may include the left-hand pane and associated control 1004 as described with regard to FIG. 10.

An association portion 1120 provides a visualization of the interconnections between elements of the system 100. This visualization may be centered on an account application, linked system 110, and so forth. In this illustration, the linked system 110 that the association portion 1120 is centered on is the continuous integration and delivery platform provided by Circle Internet Services, Inc. Connections with other linked systems 110 such as Okta, Slack, Github, Amazon Web Services, and so forth are also shown, along with a label indicative of a number of accounts associated with each linked system 110.

A log portion 1122 provides information such as activity log data 114 associated with access to the linked system 110. For example, the log portion 1122 may depict login times and other actions associated with managing or using the NHI 104. In this illustration, the NHI 104 that has been selected provides the service account associated with Okta, and so the log portion 1122 depicts actions such as use of the NHI 104 to login to the linked system 110 Okta.

A permission portion 1124 provides information about the current permissions associated with the NHI 104 that has been selected. In this illustration, the service account associated with the Okta linked system 110 has an account type of "IdP Managed Service". Also presented is a risk value, such as determined by the security assessment module 170. A current permission of "read/write" is shown, and the status of this NHI 104 is currently "Active". For example, this may be representative of the management permissions 356 that indicate a set of users that are permitted to use the NHI 104. A last login date and time is presented. Also shown is an action control that may be selected to be performed on the NHI 104. For example, the action may comprise suspending, unsuspending, deleting, and so forth. In some implementations the action may be limited to the scope of the selected linked system 110. For example, given the linked system 110 of Okta is currently selected, an action to "suspend" may result in the administration module 160 sending a provisioning request 164 to the Okta linked system 110 to suspend that account. Other accounts at other linked systems 110 that are associated with the same NHI 104 may not be affected by this action control.

FIG. 12 illustrates at 1200 a third user interface 194 providing information about the NHIs 104 of an organization, according to some implementations. The third user interface 194 may be presented using the computing device 192. The third user interface 194 may be used to modify attributes associated with an NHI 104, such as rotating user credentials, disabling an NHI 104, or performing other actions associated with the NHI 104.

An association portion 1220 lists the various linked systems 110 that are associated with the currently selected NHI 104. For example, the linked systems 110 in this illustration include Salesforce, a Kubernetes provider, Fivetran, and OpenAI.

A pre modification steps portion 1240 allows for configuration and presentation of operations that are to be performed before performing a change to the currently selected NHI 104. For example, the pre modification steps for a change in the credential data 148 may include requesting an approval in the Jira system from a member of the "DevOps" group, and once approval has been received, waiting a present time and providing a Slack notification to "#DevOps".

A post modification steps portion 1260 allows for configuration and presentation of operations that are to be performed after performing the modification of the currently selected NHI 104. For example, the post modification steps following a change in the credential data 148 may include updating key management service entries associated with "snow_svc", triggering a specified Github action, and updating a Snowflake at Fivetran.

As used in this disclosure, Okta refers to human identity 102 and access management services provided by Okta, Inc. Salesforce refers to customer relationship management software services provided by Salesforce, Inc. Fivetran refers to the automated data movement platform provided by Fivetran Inc. Amazon Web Services (AWS) refers to on-demand cloud computing services provided by Amazon Web Services, Inc. GitHub refers to the platform and cloud-based service for software development provided by GitHub, Inc. Slack refers to the cloud-based team communication platform provided by Salesforce, Inc. Snowflake refers to a cloud computing-based data storage and analytics service provided by Snowflake, Inc. OpenAI refers to the artificial intelligence service provided by OpenAI, Inc. or its subsidiary OpenAI Global, LLC. MongoDB refers to the NoSQL database program provided by MongoDB, Inc. CircleCI refers to the continuous integration and delivery platform provided by Circle Internet Services, Inc. Azure refers to Microsoft Azure and related services such as Azure Active Directory (AD) by Microsoft, Inc.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a memory, storing first computer-executable instructions; and a hardware processor to execute the first computer-executable instructions to:

instantiate a representation of an organization;

determine a first linked system that is associated with the organization;

establish a first connection with the first linked system;

retrieve, using the first connection, first ingested data, wherein the first ingested data comprises one or more of:

account data indicative of one or more user accounts, or log data based on operation of the first linked system;

determine a first set of classification rules; and determine, based on a comparison of the first ingested data using the first set of classification rules, a first non-human identity (NHI) that is associated with the organization.

2. The system of claim 1, the hardware processor to execute the first computer-executable instructions to:

determine one or more pattern matching expressions; and wherein the determination of the first NHI is further based on a comparison of the first ingested data using the one or more pattern matching expressions.

3. The system of claim 1, wherein the first NHI comprises NHI data indicative of:

an identifier value that is unique within the organization;

first data indicative of a purpose associated with the first NHI; and credential data associated with the first linked system.

4. The system of claim 1, the hardware processor to execute the first computer-executable instructions to:

determine a first identity based on the first ingested data;

determine, based on the first ingested data, a first value associated with the first identity;

determine, based on the first value, that the first identity is an indeterminate identity;

present information associated with the first identity in a user interface; and receive, via the user interface, classification data that indicates the first identity is the first NHI.

5. The system of claim 1, the hardware processor to execute the first computer-executable instructions to:

determine a first identity based on the first ingested data;

determine, based on the first ingested data, that the first identity is a mixed identity comprising a human identity and the first NHI;

determine NHI data associated with the first NHI, based on the first identity; and send a request to the first linked system to remove from the first linked system at least a portion of account data from the first identity that is associated with the first NHI.

6. The system of claim 1, the hardware processor to execute the first computer-executable instructions to:

determine a request to provision a second NHI;

create the second NHI comprising second NHI data;

determine a second linked system that is associated with the second NHI data;

establish a second connection with the second linked system; and send, using the second connection, a request to the second linked system to create an account for the second NHI at the second linked system.

7. The system of claim 1, the hardware processor to execute the first computer-executable instructions to:

determine at least one attribute of a second NHI exceeds a threshold value;

determine a second linked system that is associated with the second NHI;

determine an account at the second linked system that is associated with the second NHI;

establish a second connection with the second linked system; and send, using the second connection, a request to the second linked system to modify the at least one attribute of the account at the second linked system.

8. A computer-implemented method comprising:

instantiating, using one or more hardware processors that execute instructions, a representation of an organization;

determining, using the one or more hardware processors, a first linked system that is associated with the organization;

establishing, using the one or more hardware processors, a first connection with the first linked system;

retrieving, using the one or more hardware processors and the first connection, first ingested data;

determining, using the one or more hardware processors, a first identity based on the first ingested data;

determining, using the one or more hardware processors and based on the first ingested data, a first value associated with the first identity;

determining, using the one or more hardware processors and based on the first value, that the first identity is an indeterminate identity;

receiving classification data that indicates the first identity is a first non-human identity (NHI); and determining, using the one or more hardware processors and based on the classification data, the first NHI.

9. The method of claim 8, wherein the first NHI comprises:

an identifier value that is unique within the organization;

first data indicative of a purpose associated with use of the first NHI; and credential data associated with the first linked system.

10. The method of claim 8, wherein the first ingested data comprises one or more of:

account data indicative of one or more user accounts, or log data based on operation of the first linked system.

11. The method of claim 8, further comprising:

presenting information associated with the first identity in a user interface; and wherein the classification data is received via the user interface.

12. The method of claim 8, further comprising:

determining, using the one or more hardware processors and based on the first ingested data, that the first identity is a mixed identity comprising a human identity and the first NHI;

determining, using the one or more hardware processors, NHI data associated with the first NHI, based on the first identity; and sending, using the one or more hardware processors, a request to the first linked system to remove from the first linked system at least a portion of account data from the first identity that is associated with the first NHI.

13. The method of claim 8, further comprising:

determining, using the one or more hardware processors, a request to provision a second NHI;

creating, using the one or more hardware processors, the second NHI comprising second NHI data;

determining, using the one or more hardware processors, a second linked system that is associated with the second NHI data;

establishing, using the one or more hardware processors, a second connection with the second linked system; and sending, using the one or more hardware processors and the second connection, a request to the second linked system to create an account for the second NHI at the second linked system.

14. The method of claim 8, further comprising:

determining, using the one or more hardware processors, at least one attribute of a second NHI exceeds a threshold value;

determining, using the one or more hardware processors, a second linked system that is associated with the second NHI;

determining, using the one or more hardware processors, an account at the second linked system that is associated with the second NHI;

establishing, using the one or more hardware processors, a second connection with the second linked system; and sending, using the one or more hardware processors and the second connection, a request to the second linked system to modify the at least one attribute of the account at the second linked system.

15. A system comprising:

a memory, storing first computer-executable instructions; and a hardware processor to execute the first computer-executable instructions to:

retrieve first ingested data;

determine a first identity based on the first ingested data;

determine, based on the first ingested data, that the first identity is a mixed identity comprising a human identity and a first non-human identity (NHI) that is associated with an organization;

determine a request to provision the first NHI that is associated with the organization;

create the first NHI in the memory;

determine a first linked system that is associated with the first NHI;

establish a first connection with the first linked system;

send, using the first connection, a first request to the first linked system to create a first account for the first NHI at the first linked system;

determine first credential data associated with first account;

store the first credential data in the memory; and associate the first credential data with the first NHI.

16. The system of claim 15, wherein the first NHI comprises a unique combination within the organization of:

an identifier value that is unique within the organization;

the first credential data; and one or more of:

purpose data indicative of a purpose associated with the first NHI, association data indicative of the first linked system, or permission data indicative of one or more permissions associated with the first NHI.

17. The system of claim 15, the hardware processor to execute the first computer-executable instructions to:

determine a request to deprovision the first NHI;

send, using the first connection, a second request to the first linked system to discontinue the first account at the first linked system;

remove the first credential data from the memory; and remove the first NHI from the memory.

18. The system of claim 15, the hardware processor to execute the first computer-executable instructions to:

send, using the first connection, a second request to the first linked system to:

discontinue use of the first credential data with the first account; and associate second credential data with the first account;

associate the second credential data with the first NHI; and remove the first credential data from the memory.

19. The system of claim 1, the hardware processor to further execute the first computer-executable instructions to:

present information associated with the first NHI in a user interface; and receive, via the user interface, confirmation data that the NHI is correct.

20. The system of claim 1, the hardware processor to further execute the first computer-executable instructions to:

determine, based on the first ingested data and using the first set of classification rules, a first value associated with an identity; and compare the first value to an NHI threshold value.

* * * * *